United States Patent [19]
Earl

[11] 3,926,204
[45] Dec. 16, 1975

[54] PRESSURE REGULATOR

[75] Inventor: Webster B. Earl, Pfafftown, N.C.

[73] Assignee: Fairchild Industries, Inc., Germantown, Md.

[22] Filed: May 17, 1974

[21] Appl. No.: 470,837

[52] U.S. Cl. .......................................... 137/116.5
[51] Int. Cl.² ........................................ G05D 16/06
[58] Field of Search ................................. 137/116.5

[56] References Cited
UNITED STATES PATENTS

| | | | |
|---|---|---|---|
| 2,806,481 | 9/1957 | Faust | 137/116.5 |
| 3,420,257 | 9/1964 | Lansky et al. | 137/116.5 |

FOREIGN PATENTS OR APPLICATIONS

| | | | |
|---|---|---|---|
| 1,263,971 | 5/1961 | France | 137/116.5 |

*Primary Examiner*—Robert G. Nilson
*Attorney, Agent, or Firm*—Michael W. York

[57] ABSTRACT

A pressure regulator including a body having an inlet and an outlet port and a control chamber associated with the body. A laterally movable exhaust valve seat member having a valve seat and an aperture for exhausting fluid from the control chamber is located within the control chamber. A supply valve including a supply valve seat and a supply valve head portion is also provided and is located between the inlet and outlet ports of the body to control the passage of fluid from the inlet port to the outlet port, and the head portion has an associated stem with a spherical tip portion which engages the valve seat of the exhaust valve seat member. A damping weight is also provided which is located adjacent to the supply valve head portion and this damping weight tends to prevent the common valve noise known as buzz.

11 Claims, 2 Drawing Figures

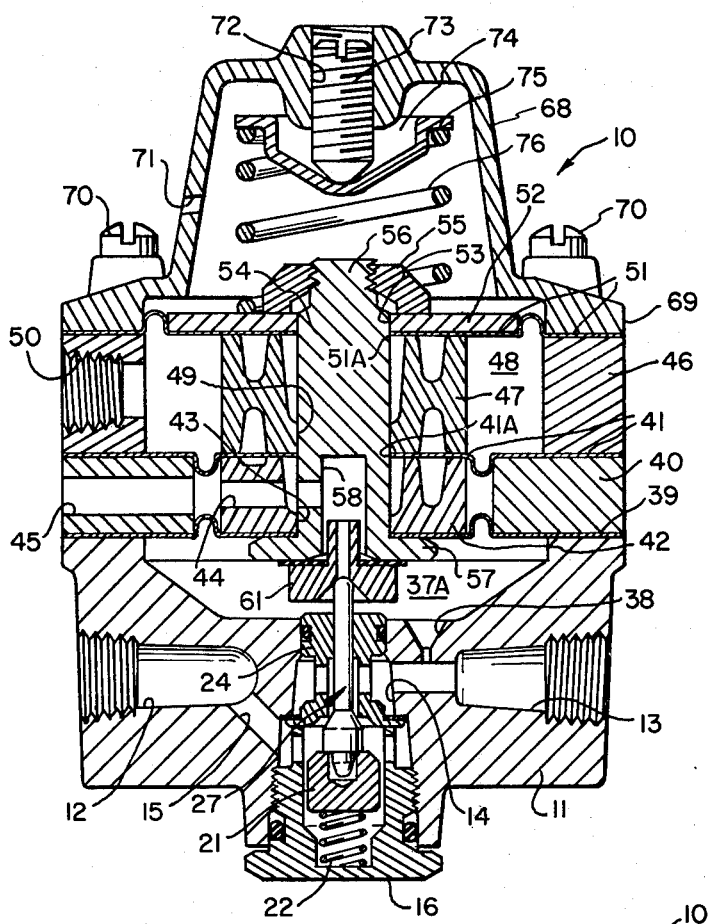

3,926,204

PRESSURE REGULATOR

BACKGROUND OF THE INVENTION

Pressure regulators or pressure controllers such as those disclosed in U.S. Pat. Nos. 2,707,966 and 2,831,494 have many uses and have been used for many years. In spite of the benefits associated with pressure regulators, they also have many disadvantages. Pressure regulators of the types disclosed in these patents which have been on the market all tend to some degree to be subject to vibration which is undesirable. Furthermore, such pressure regulators are inherently very difficult to assemble, since it is very difficult to properly align the valve stem with its associated valve seat and a misaligned valve stem results in undesirable side loading of the valve stem by the exhaust valve seat. In general, concentricity has been hard to hold during assembly because of the number of parts involved and the flexibility of the diaphragms. In this connection, it should be noted that the diaphragms of necessity during assembly are not pressurized and are not spring loaded. Consequently, even when a valve stem is concentric during assembly, it may not be concentric when the diaphragms are loaded by fluid and by spring forces. Moreover, the convoluted type diaphragms which are utilized in such pressure regulators are generally prone to change position when pressurized and this presents a major design problem.

Pressure regulators of the type disclosed in these patents also require expensive machining in order to reduce leakage and even with correct machining they still tend to have some undesirable leakage. The type of pressure regulators disclosed in these patents also do not lend themselves to ready use in circumstances in which extra boost is required or in circumstances which place unusually heavy exhaust requirements upon a valve or under unstable conditions. In these circumstances, the valve is likely to oscillate and what is called valve buzz is likely to occur. When valve buzz occurs, this results in an unstable valve which produces varying pressures. Also, damage to the regulator can result from valve buzz. These prior art pressure regulators also have numerous parts which tend to make trouble free operation difficult and increase the cost of maintenance and overhaul.

The present invention overcomes these problems associated with prior art pressure regulators and provides a pressure regulator which is subject to less vibration, that does not require expensive machining and is easy to assemble. Moreover, the pressure regulator of the present invention has fewer parts and more simplified valving and thus provides for trouble free performance, simpler maintenance and fewer parts of overhaul.

BRIEF DESCRIPTION OF THE INVENTION

This invention relates to pressure regulators and more particularly to pressure regulators which utilize a pressure control chamber.

It is an object of the present invention to provide a pressure regulator which is not subject to vibration.

It is also an object of the present invention to provide a pressure regulator which is easy to assemble.

It is also an object of the present invention to provide a pressure regulator which has provisions for extra damping of the valve.

It is also an object of the present invention to provide a pressure regulator in which side loading of the valve stem by the exhaust valve seat is greatly reduced or eliminated.

It is also an object of the present invention to provide a pressure regulator in which leakage from the regulator is greatly reduced.

It is a further object of the present invention to provide a pressure regulator which has fewer and simplified parts and is subject to trouble free operation.

The present invention provides a pressure regulator including a body having an inlet and an outlet port, means associated with the body for defining at least a portion of a control chamber and a laterally movable exhaust valve seat member having a valve seat and an aperture for exhausting fluid from the control chamber. A supply valve with a supply valve seat and a supply valve head portion is also provided and is located between the ports and means is provided which is associated with the supply valve head portion for engaging the valve seat of the exhaust valve seat member.

BRIEF DESCRIPTION OF THE DRAWINGS

The invention will be hereinafter more fully described with reference to the accompanying drawings in which:

FIG. 1 is a vertical sectional view of the pressure regulator of the present invention taken substantially through the center of the regulator; and FIG. 2 is an enlarged view of a portion of the structure illustrated in FIG. 1.

DETAILED DESCRIPTION OF THE PREFERRED EMBODIMENT

The pressure regulator of the present invention is illustrated in the figures and is designated generally by the number 10. The pressure regulator 10 comprises a body 11 which has an inlet port 12 and an outlet port 13 which are both threaded to receive suitable conduits which are not shown. The body 11 has an axially located aperture 14 which intersects the inner end of the outlet port 13 and another aperture 15 is provided in the body. That aperture 15 extends from the inlet or supply port 12 downward to the axially located aperture 14. The lower portion of the aperture 14 is closed by a valve retained member 16 whose threads 17 engage the threads 18 on the inner surface of the aperture 14. An O-ring retainer seal 19 is located around the retainer valve member between it and the body 11. The retainer valve member 16 has an aperture 20 extending partially through it, and a damping weight 21 and a compression valve closing spring 22 are located in this aperture. Two apertures 20A extend outward from the aperture 20 through the walls of the upper portion of the retainer valve member 16.

The upper end portion of the aperture 14 has a valve stem guide portion 23, of a combined valve stem guide and valve seat member 24, located in it and the valve stem guide portion has a centrally located aperture 25 extending through it. Located immediately below the valve stem guide portion 23 is a valve seat portion 26 which has an axially located aperture 25A which is larger in diameter than the aperture 25. Two apertures 25B extend from the aperture 25A outward through the walls of the valve stem guide and valve seat member 24. An elongated valve member 27 is located within the aperture 14 and the valve member has a valve stem 28 which is slidably received by the aperture 25 in the valve stem guide portion. A portion of the valve stem 28 also fits within the aperture 25A. An enlarged partially tapering pintle or valve head portion 29 is located in the lower portion of the valve member 27 and this valve head portion is adapted to engage the valve seat 30 of the valve seat portion 26. The tapering portion of the valve head portion 29 is covered with a thin resilient rubber or elastomeric coating 29A. A cylindrical projection 31 is located on the lower portion of the valve member 27 and this projection extends into and is loosely received by a blind aperture 32 in the upper end of the damping weight 21.

In order to provide for sealing, an O-ring 33 is located around the outer periphery of the valve stem guide portion 23 in a channel 34 and a valve seat gasket 35 is located between a lip 36 on the valve seat portion 26 and the body 11. The upper inner portion of the body 11 has a bowl shaped depression 37 which forms a part of a control chamber 37A and the aperture 14 extends upward into this depression. A tapered suction orifice 38 extends downward from this depression 37 into the output port 13.

A control diaphragm 39 is located immediately on top of the body 11 and it extends across most of the top of the depression 37 and the control diaphragm has a centrally located aperture 39A. A circular ratio ring 40 is located on top of the outer periphery of the control diaphragm 39. A lower small ratio diaphragm 41 has its outer periphery in contact with the upper surface of the ratio ring 40, and the interior portion of the lower ratio diaphragm covers a substantial portion of the aperture in the center of the ratio ring 40. The lower ratio diaphragm 41 has a centrally located aperture 41A. A movable lower ratio piston 42 is located between the diaphragms 39 and 41 and this piston has an axially oriented aperture 43 extending through it and another venting aperture 44 which extends radially outward from the interior of the piston. The outer end of this venting aperture 44 is located in close proximity to the inner end of another venting aperture 45 which extends radially outward from the interior to the exterior of the ratio ring 40.

A cylindrical hollow signal chamber ring 46 is located immediately above the lower ratio diaphragm 41 and a spacer 47 is located within the signal chamber 48 which is partially formed by this ring. The spacer 47 has a centrally located aperture 49 extending through it and the signal chamber ring 46 has a threaded port 50 extending through its wall which is threaded to receive a suitable conduit which is not shown. An upper large ratio diaphragm 51 has its outer periphery located on top of the signal chamber ring 46 and the interior portion of this diaphragm covers a substantial portion of the upper opening of the signal chamber ring. The diaphragm 51 also has a centrally located aperture 51A.

A flat disc shaped upper ratio piston 52 is located above the central portion of the diaphragm 51 and this piston is provided with a centrally located aperture 53. A clamping bolt 54 extends upward through the apertures 39A, 43, 41A, 49, 51A and 53 and a clamping nut 55 is threaded on the upper thread portion 56 of the bolt. This clamping nut 55 causes pressure to be exerted by the flange portion 57 of the clamping bolt 54 on the underside of the central portion of the diaphragm 39. The bolt 54 and is associated nut 55 clamp the piston 52, the spacer 47, the piston 42, and the central portions of the diaphragms 51, 41 and 39 together.

The inner end portion of the bolt 54 has a blind hole 58 and an aperture 58A extends radially outward from this hole toward the inner opening of the vent port 44 located in the piston 42. A cone shaped depression 59 is located on the head portion of the bolt at the entrance to the hole 58. A hollow tubular projection 60 which forms part of an exhaust valve seat member 61 extends upward into and is loosely received by the hole 58. The exhaust seat member 61 has a flange or head portion 62 whose upper surface abuts up against a gasket 63 which in turn rests upon the lower surface of the head portion of the bolt 54. The inner portion of the head portion 62 has a conical depression 64 and an aperture 65 extends from this depression up through the projection 60. Since the projection 60 is loosely received by the hole 57 the exhaust seat member 61 is capable of moving laterally in any direction to the extent permitted by the gasket 63 and the walls of the hole 58. The inner circumference 66 of the depression 64 serves as a valve seat for the spherical upper end exhaust valve head portion 67 of the valve stem 28. It should be noted that the spherical shape of the upper valve end portion 67 permits angular misalignment of the valve stem 28 with respect to the valve seat 66 since the spherical end will still maintain correct contact with the exhaust valve seat even though the stem is tipped to one side.

A conventional bonnet 68 has its rim portion 69 located immediately above the rim portion of the diaphragm 51. The bonnet 68 is connected to the signal chamber ring 46 by conventional screws 70 which engage suitable threaded holes (not shown) in the upper portion of the body 11. The hollow interior of the bonnet 68 is vented to the atmosphere by means of the vent hole 71 located in the wall of the bonnet. The upper inner portion of the bonnet is provided with a threaded aperture 72 and an adjusting screw 73 is threaded into this aperture. The lower end of the adjusting screw 73 abuts against an inner depression of a spring seat 74 whose rim portion 75 is in contact with a range compression spring 76 whose lower end pushes against the upper ratio piston 52.

As best illustrated in FIG. 2, a small notch 77 is provided in the surface of the valve seat 66. This notch 77 allows a small but constant amount of leak fluid to escape at all times when the outlet pressure is above zero. This leak fluid keep the exhaust valve at its crack point and prevents the spherical valve head 67 from pushing too tightly into its seat. This improves the sensitivity of the valve and improves droop and also the soft valve material is not forced into the seat as would be the case without a small leak flow. As a consequence, the valve life is greatly increased. As previously indicated, the projection 60 is free to move in a horizontal direction within the hole 58. This allows the exhaust seat member 61 to move sidewise in any direction within the confines of the walls of the hole 58 and this permits compensation for any axial misalignment of the clamp bolt 54 and the associated diaphragms since the spherical upper end 67 of the valve stem 28 when it pushes into the conical depression 64 will tend to automatically center the valve seat member 61.

If this misalignment were not compensated for, the valve stem 28 would be pushed to one side causing friction between it and the valve stem guide portion 23 and this would also cause the valve stem 28 to misalign itself and as a consequence the upper end portion 67 of the valve stem would rub on one side of the valve seat 66. This would cause loss of sensitivity and erratic changes in output pressures as the soft valve member 61 in order to close or open would be required to push the other parts in line or permit its surface to be compressed on one side before a pressure balance could be obtained.

A major problem in the manufacture of pressure regulators or pressure controllers of this type has been side loading of the valve stem by the exhaust seat. Concentricity has been hard to achieve because of the number of parts involved and the flexibility of the diaphragms. In this connection, it should be noted that the diaphragms are assembled into the valves when they are not pressurized or under any spring load and even when the diaphragms are checked for concentricity in this state they will usually not be concentric when they are subjected to a spring load or when they are loaded by a fluid. Furthermore, the convoluted type diaphragm generally used in pressure regulators of this type change position when they are pressurized and this presents a major design problem. These major problems associated with prior art pressure regulators have been eliminated in the present invention by virtue of a movable valve seat member 61 which is self centering.

Even though the valve seat member 61 is movable the gasket 63 prevents any leakage between the adjacently located clamp screw 54 and the valve seat member 61. Another unique feature of the pressure regulator of the present invention is a large area or volume behind this gasket 63 which is provided by the depression 59 and the hole 58. The resulting pressure difference across the valve seat gasket 63 and the valve seat member 61 results in the valve seat member being firmly held in place during periods of exhaust and this prevents the valve seat member from shifting to one side, which would be especially likely to occur when the regulator is mounted in a horizontal position. Consequently, the valve seat member 61 cannot rattle, buzz or change position and this helps maintain a more constant output pressure from the regulator.

The damping weight 21 which is located between the head or pintle portion 29 of the valve member 27 and the valve spring 22 is free to move axially except as restrained by the valve spring. The damping weight 21 is guided by the projection 32 on the lower end of the pintle portion 29 of the valve member 27. This projection 31 extends into the hole 32 in the upper portion of the weight 21 and in view of the size of the hole 32 the weight is a loose fit on this projection.

In relays, pressure controllers or regulators of this type there is always a tendency at some flow conditions or for some flow changes for the regulator or controller to oscillate or buzz. This oscillation or buzz occurs at a frequency which is determined by the size of the valve member, the weight of the valve member and the frequency of the valve spring as well as the weight of the diaphragm assembly, the frequency of the range spring and the type of diaphragm material.

The usual damping practice in such relays, controllers or regulators is to restrict the size of the suction hole in the output passage and to isolate the chamber below the control diaphragm by insuring that there is a close fit between the valve guide and the valve stem. In this situation, some pressure regulators may be damped by the time lag between the actual valve movement and the control diaphragm sensing of a pressure change caused by this movement. However, under some conditions it is not desirable to restrict the sensing of the pressure change because of time lag or to restrict the size of the suction hole. With the present invention, by the addition of the damping weight 21 below the valve member and above the valve spring 22, a means has been found to control the oscillation or buzz without requiring the reduction in the suction hole or the reduction of clearance around the valve stem to the low limits which would otherwise be required.

The damping weight is sized so that it will, as a result of its momentum, travel slightly further than the valve member 27. As the weight forces the spring 22 downward it is opposed by this spring and when sized correctly it will collide with the valve member 27. As the weight 21 again moves upward pushed by the spring 22 and as the valve member 27 moves downward at its normal oscillating frequency, the valve member 27 and the weight 21 will collide and dissipate the energy required to keep the buzz or oscillation continuing. This will stop the buzz or oscillation and allow the pressure controller or regulator to function in a normal quiet manner.

The size of the damping weight 21 is best determined by tests due to the complexity of calculating the oscillating frequency of the valve member 27. This frequency is easily measured however, and after the weight is determined for a given combination of valve member 27, spring 22, valve clearance, suction orifice, diaphragm size and range spring 76 the same weight size will be non-critical over a fairly wide range of conditions and hence normal variations and manufacturing tolerances will not require alteration in the weight. The use of the damping weight allows a wider latitude in the design of the pressure regulator and allows the use of a larger suction orifice 38 and larger clearances around the valve stem than would otherwise be allowable. It also allows the use of lighter or weaker valve closing springs 22 than would otherwise be permitted. The damping weight 21 also allows the use of the pressure regulator under shock loads which would normally excite the valve system in the oscillating at its normal oscillating frequency. It should be noted that the valve return spring 22 must be light enough or weak enough to allow the weight 21 by its inertia to leave the valve member 27.

The damping weight used in the presence regulator of this invention is a novel solution to an old problem of buzz or unstability in a valve system. This solution will be especially useful in the smaller unbalanced type of system which uses weaker springs with a fairly high differential pressure across the valve members. Furthermore, with the damping weight of the present invention damping is accomplished within the first few cycles of an unstable period for the valve system.

The equation for the outlet pressure $P_o$ in the output port 13 for the pressure regulator of this invention in its balanced or no flow condition is set forth below.

$$P_o = \frac{K_1 - K_2}{D_3} - \frac{P_{sig}}{D_1 - D_2} - V_1 (P_{sup} - P_o)$$

Where:
$K_1$ is the range spring 76 force
$K_2$ is the valve closing spring 22 force
$P_{sig}$ is the pressure in the signal chamber 48
$V_1$ is the effective area of the supply valve $P_{sup}$ is the supply pressure at the inlet port 12
$D_1$ is the effective area of the upper ratio diaphragm 51
$D_2$ is the effective area of the lower ratio diaphragm 41
$D_3$ is the effective area of the control diaphragm 39

For a constant supply pressure $P_{sup}$ it is possible to adjust the effective diaphragm areas to compensate for the valve unbalanced factor $V_1$ ($P_{sup}$ - $P_o$) and thus eliminate this factor without any effect on the accuracy of the output pressure $P_o$ in response to the signal pressure $P_{sig}$. Consequently, the above equation can be simplified. Furthermore, the spring force $K_1$ - $K_2$ becomes a single factor $K_3$ by the simple adjustment of the mechanical adjusting means which comprises the range screw 73 and consequently, the previous formula then becomes $$P_o = \frac{K_3}{D_3} - \frac{P_{sig}}{D_1 - D_2}$$

It should be realized that $D_1$ and $D_2$ can be varied and that $D_1$ can be larger or smaller than $D_2$. However, for a given regulator this formula can be reduced to $$P_o = \frac{K_3}{D_3} - \alpha$$

Where $\alpha$ is a plus or minus factor determined by the ratio of the variable pressure in the signal chamber $P_{sig}$ to the difference in the effective area of the ratio diaphragms $D_1$ - $D_2$, which is fixed for a given regulator. This equation for the output pressure is quite simple compared to the equivalent complex formula expressing the output pressure for the pressure regulators described in U.S. Pat. Nos. 2,707,966 and 2,831,494.

The pressure regulator 10 of the present invention is utilized in the following manner. The appropriate inlet, outlet and signal ports 12, 13 and 50 are connected to suitable fittings. Supply fluid such as a gas under suitable pressure is then permitted to enter the inlet port 12 and the fluid then enters the lower supply chamber which is located around the pintle portion 29 of the valve member 27 and forms part of the upper portion of the aperture 20. In order to enter this chamber the gas or fluid under pressure passes through one or both of the ports 20A located in the upper walls of the valve closing member 16. When the valve head portion 29 of the valve member 27 is moved away from its valve seat 30, the gas or fluid will pass in a controlled manner into the conduit 25A and from there through the ports 25B into the outlet port 13.

Gas is supplied to the outlet port 13 on demand so as to balance the entire system and maintain the output pressure as set in a positive manner by the loading spring 76 and the associated adjustment screw 73. The downward force exerted by the spring 76 on the control diaphragm 39 is balanced by the upward pressure in the control chamber 37A which exerts an upward force on the central portion of the diaphragm 39. The effect from the spring 76 may be reduced by supplying fluid into the signal port 50 and into the signal chamber 48 which is partially defined by the ring 46. The gas that is within the chamber 48 will exert a force upon the diaphragms 41 and 51 which will tend to counteract the force exerted by the spring 76. This counteraction force is determined by the excess of the effective area of the diaphragm 51 over the effective area of the diaphragm 41. The system will then come into balance when enough gas or fluid is allowed to flow between the supply valve head portion 29 and its seat 30 and through the suction orifice 38 into the chamber 37A to create a balanced condition as a result of the application of fluid pressure on the diaphragm 39. It should be noted that the valve member 27 is urged upward for positive closing by the return valve spring 22.

It will be appreciated that under certain circumstances where it is not desired to vary the pressure in the outlet port 13 through the use of pressure in the signal chamber 48, then the regulator 10 can be utilized without connecting the signal port 50 to a suitable source of pressurized fluid.

Although the invention has been described in considerable detail with reference to a certain preferred embodiment it will be understood that variations and modifications may be made within the spirit and scope of the invention as defined in the appended claims.

What is claimed is:

1. A pressure regulator comprising a body having an inlet and an outlet port, means associated with said body for defining at least a portion of a control chamber, means associated with said control chamber for defining a second chamber including two diaphragms, means for connecting the central portions of said diaphragms including a member having a hole therein, an exhaust valve seat member including a projection and having a valve seat with an aperture extending from the valve seat through said projection for exhausting fluid from said control chamber, the projection of said exhaust valve seat member being laterally moveable within the confines of the hole in the member of said connecting means, the hole of said member being sized to permit free movement of said exhaust valve seat member to compensate for misalignment of said member and said diaphragms, a supply valve including a supply valve seat and a supply valve head located between said ports and means associated with said supply valve head for engaging the valve seat of said exhaust valve seat member.

2. The pressure regulator of claim 1 further comprising means associated with said supply valve head for damping said supply valve head.

3. The pressure regulator of claim 2 wherein said damping means comprises weight means for colliding with said supply valve head for dissipating the energy required to prevent buzz or valve oscillation from continuing.

4. The pressure regulator of claim 3 wherein said weight means comprises a weight member so sized that as a result of its momentum it will travel slightly further than said supply valve head and further comprising means in contact with said weight member for biasing said weight member toward said supply valve head.

5. The pressure regulator of claim 4 further comprising a projection extending from said supply valve head and wherein said weight member has a hole so sized for the projection to loosely fit in the hole of said weight member.

6. The pressure regulator of claim 1 further comprising a gasket member located around the projection of said exhaust valve seat member and covering a portion of the entrance to the hole in the member of said connecting means.

7. The pressure regulator of claim 6 wherein the entrance to the hole in said member which is partially covered by said gasket is a conical shaped depression.

8. The pressure regulator of claim 6 wherein the hole in the member of said connecting means extends only partially through said member and wherein said member has another aperature which extends outward from the hole.

9. The pressure regulator of claim 1 wherein at least a portion of said supply valve head is covered with a resilient coating.

10. The pressure regulator of claim 1 further comprising means for exerting a force against said control diaphragm to counteract the effect of fluid pressure in said control chamber and wherein the two diaphragms which at least partially define said second chamber have different effective areas for permitting alteration of the effect of said force exerting means through the application of fluid pressure to said second chamber.

11. The pressure regulator of claim 10 further comprising mechanical means for adjusting the force exerted by said force exerting means and wherein the pressure in the outlet port of said body is determined substantially according to the formula $$P_o = \frac{K_3}{D_3} - \alpha$$

where $K_3$ is a value determined by said mechanical adjusting means, $D_3$ is the effective area of said control diaphragm, and $\alpha$ is a plus or minus factor determined by the ratio of the pressure in the second chamber to the difference in the effective area of the two diaphragms partially defining said second chamber.

* * * * *